| Position | Molar ratio of basic composition | | | Position | Molar ratio of basic composition | | |
|---|---|---|---|---|---|---|---|
| | $Pb(Mg_{1/3}Nb_{2/3})O_3$ | $PbTiO_3$ | $PbZrO_3$ | | $Pb(Mg_{1/3}Nb_{2/3})O_3$ | $PbTiO_3$ | $PbZrO_3$ |
| A | 0.875 | 0.125 | 0.000 | L | 0.010 | 0.615 | 0.375 |
| B | 0.875 | 0.000 | 0.125 | M | 0.125 | 0.625 | 0.250 |
| C | 0.050 | 0.000 | 0.950 | N | 0.250 | 0.625 | 0.125 |
| D | 0.010 | 0.040 | 0.950 | O | 0.500 | 0.500 | 0.000 |
| E | 0.010 | 0.813 | 0.177 | P | 0.500 | 0.375 | 0.125 |
| F | 0.187 | 0.813 | 0.000 | Q | 0.500 | 0.250 | 0.250 |
| G | 0.625 | 0.375 | 0.000 | R | 0.125 | 0.250 | 0.625 |
| H | 0.625 | 0.125 | 0.250 | S | 0.0625 | 0.3125 | 0.625 |
| I | 0.500 | 0.125 | 0.375 | T | 0.0625 | 0.500 | 0.4375 |
| J | 0.1875 | 0.1875 | 0.625 | U | 0.375 | 0.500 | 0.125 |
| K | 0.010 | 0.240 | 0.750 | | | | |

FIG. 1

INVENTORS
Hiromu Ouchi
Katsuo Nagano
Kenichi Iwamoto

BY Stevens, Davis, Miller & Mosher

ATTORNEYS

FIG. 7
Basic compositions

FIG. 8
Compositions with additives

United States Patent Office 3,268,453
Patented August 23, 1966

3,268,453
PIEZOELECTRIC CERAMIC COMPOSITIONS
Hiromu Ouchi, Toyonaka-shi, and Katsuo Nagano and Kenichi Iwamoto, Kadoma-shi, Japan, assignors to Matsushita Electric Industrial Co., Ltd., Osaka, Japan, a corporation of Japan
Filed Apr. 26, 1965, Ser. No. 450,738
Claims priority, application Japan, Apr. 28, 1964, 39/24,673, 39/24,674; May 27, 1964, 39/30,161; June 18, 1964, 39/34,911; July 8, 1964, 39/39,566; Sept. 10, 1964, 39/52,112; Sept. 26, 1964, 39/55,421
10 Claims. (Cl. 252—62.9)

This invention relates to piezoelectric ceramic compositions and articles of manufacture fabricated therefrom. More particularly, the invention pertains to novel and improved ferroelectric ceramics which are polycrystalline aggregates of particular constituents. These piezoelectric compositions are sintered to ceramics by ordinary ceramic techniques and thereafter the ceramics are polarized by applying a D.-C. voltage between the electrodes to impart thereto electromechanical transducing properties similar to the well-known piezoelectric effect. The invention also encompasses the calcined product of raw ingredients and the articles of manufacture such as electromechanical transducers fabricated from the sintered ceramic.

The ceramic bodies materialized by the present invention exist basically in the following solid solution: (1) the binary system of $Pb(Mg_{1/3}Nb_{2/3})O_3$-$PbTiO_3$, (2) the ternary system of $Pb(Mg_{1/3}Nb_{2/3})O_3$-$PbTiO_3$-$PbZrO_3$ where niobium atom can be replaced by tantalum and (3) the solid solution comprising said ternary system and the additive thereto, in oxide form, of at least one element selected from the group consisting of manganese, cobalt, nickel, iron and chromium up to 3 weight percent. Because of their lower cost, ease in fabrication into various shapes, and greater durability at high temperature and/or humidity than crystalline substances such as Rochelle salt, many applications of piezoelectric ceramics have recently been found with electromechanical transducer or electromechanical wave filter. The piezoelectric characteristics of ceramics apparently vary with species of applications. Electromechanical transducers such as a phonograph pick-up and a microphone require a high output voltage and a flat response of frequency characteristics. Therefore, the piezoelectric ceramics are required to have a substantially high electromechanical coupling coefficient and high dielectric constant. Electromechanical wave filters for 455 kc. IF filters of radio receiver and for 4.5 mc. sound IF filters of TV should have a specified value of coupling coefficient, a low resonant resistance and a high mechanical quality factor. Besides, the transducers require a high stability with temperature and time in resonant frequency and in other electrical properties. Furthermore, it is desirable that ceramic material have a high Curie temperature for high temperature use.

As more promising ceramics for these requirements, lead titanate-lead zirconate and lead titanate-lead zirconate-lead stannate are in wide use and their properties are disclosed in U.S. Patents Nos. 2,708,244 and 2,849,404. Some modifications of lead titanate zirconate ceramics have been made with substitutions and additions of various elements as shown in U.S. Patents Nos. 2,906,710, 2,911,370, 3,006,857 and 3,068,177. Among the piezoelectric ceramics obtained from these patents and conventional lead titanate-zirconate ceramics, there is, however, no materials satisfying all of the following characteristics: Mechanical quality factor $Q_M$ is higher than 1,000, resonant resistance is low, planar piezoelectric coupling coefficient is more than 30 percent and furthermore stability in piezoelectric properties with operating temperature and/or time is excellent. A ceramic material satisfying these requirements, however, has been recently demanded for a special electronic device.

An improved sound trap circuit of a transistor TV requires a new 4.5 mc. ceramic resonator composed of a thickness-shear mode which preferably exhibits electrodes made by electroless plating at low temperatures to prevent depolarization. Therefore, the piezoelectric ceramics for this new device should have a good durability for electroless plating solution and an excellent adhesion to plated electrodes.

It is, therefore, the fundamental object of the prseent invention to provide novel and improved piezoelectric ceramic materials which meet the specified properties outlined as above.

Another object of the invention is to provide novel piezoelectric ceramics characterized by relatively high dielectric constant and piezoelectric coupling coefficient, and their high stabilities the operating temperature.

A further object of the invention is to provide improved piezoelectric ceramics characterized by very high mechanical quality factor, low resonant resistance, relatively high piezoelectric coupling coefficient, high stability with operating temperature and time, and their high durability with humidity and electroless plating solutions.

Still another object of the invention is the provision of improved electromechanical transducer and thickness shear disc resonator utilizing, as the active elements, an electrostatically polarized body of the novel ceramic compositions.

Another object is the provision of ceramic materials exhibiting both a high piezoelectric effect and a high dielectric constant. The piezoelectric ceramic compositions according to the present invention can fully serve the intended purpose, and the procedure of their attainment will be readily apparent from the following description.

The present investigation has been achieved in the following manner. It was found that a solid solution in a perovskite-type structure was formed from a mixture of $Pb(Mg_{1/3}Nb_{2/3})O_3$ and $PbTiO_3$ in all proportions. The solid solution has a morphotropic phase boundary at a composition of 59.0 mole percent of and 41.0 mole percent of $PbTiO_3$. A planar piezoelectric coupling coefficient is the highest at a vincinity of morphotropic composition and becomes lower as a composition departs from the morphotropic composition. The finding in the present system is the same as that for lead titanate-zirconate. Further, a ternary system of

$PbTiO_3$ and $PbZrO_3$ has been studied to find a good piezoelectric composition. The ternary system also exists in a solid solution in all compositions. The piezoelectric property is considerably better in the ternary system than in the above binary system, and is excellent at a vicinity of morphotropic composition. The solid solution of ternary system exists in a perovskite-type structure of $Pb(Mg_{1/3}Nb_{2/3})O_3$ which is modified by partially replacing sites of $(Mg_{1/3}Nb_{2/3})$ with Ti and/or Zr. Since $Pb(Mg_{1/3}Nb_{2/3})O_3$ exists in a perovskite-type structure expressed by the general formula of $A^{2+}B^{4+}O_3^{2-}$, where A is a divalent ion; B, a tetra valent ion; and O, oxygen ion, an atomic ratio of Mg:Nb in B site should be 1:2 to make the solid solution crystal neutral in electricity. When the atomic ratio of Mg:Nb deviates from 1:2, the structure exists in a nonstoichiometric compound forming vacancy sites. This results in low resistivity and poor polarization. If the deviation is large, the ternary system exists in two phases which also result in a poor piezoelectricity. The use of Ca, Sr, or Ba in place of Mg lowers piezoelectricity.

According to another feature of the present invention, an oxide of at least one element selected from the group including manganese, cobalt, nickel, iron and chromium is added to the ternary system to reduce the resonant resistance, to enlarge the mechanical quality factor $Q_M$ and to lower the temperature variation of the resonant frequency. It is desirable that the additive amount, in oxide form, be up to 3% by weight.

The present invention has various advantages in manufacturing process and in application for ceramic filters and other items. It has been known that the evaporation of PbO during firing is a problem in sintering of lead compounds such as lead titanate zirconate. The invented composition, however, shows a smaller amount of evaporated PbO than lead titanate zirconate usually does. The ternary system can be fired without any particular control of PbO atmosphere. A well-sintered body of present composition is obtained by firing in a ceramic crucible with a ceramic cover made of $Al_2O_3$ ceramics. A high sintered density is desirable for humidity resistance and capsuling when the sintered body is applied to a resonator and other items. The specially high density body of the present invention has a high resistance for corrosion with electrolytic plating reagent and plays an important role in the formation of mechanically strong electrodes for thickness shear mode resonator in a disc form.

Ceramic bodies made by the present invention exhibit a planar piezoelectric coupling coefficient $k_p$ higher than 30% and a mechanical quality factor $Q_M$ higher than 1,000, whereas the conventional lead titanate zirconate ceramics of $Pb(Ti-Zr)O_3$ exhibit a $Q_M$ of about 400. Ceramic materials of a low mechanical quality factor have a low potential in applications for electronic devices. A high mechanical quality factor is needed for applications to a narrow-band oscillator. The ceramic material of the present invention gives a resonant resistance R lower than that of piezoelectric ceramic resonators available commercially and thus is suitable for ceramic filters of 455 kc. or 4.5 mc. For example, 4.5 mc. thickness shear disc resonators in a diameter of 2.8 mm. employing conventional materials have exhibited a resonant resistance R of 2.5 ohms and a mechanical quality factor $Q_M$ of 200, and 455 kc. disc resonators employing similar materials have exhibited a resonant resistance R of 12 to 15 ohms, a mechanical quality factor $Q_M$ of 400, 0.1% of a change in resonant frequency within the range 20° C. to 85° C.

$fr(85°$ C.) and $fr(20°$ C.) are frequency at 85° C. and 20° C., respectively) and a planar coupling coefficient $k_p$ of 35%. On the other hand, the 4.5 mc. thickness shear disc resonator employing the ceramic composition according to the present invention exhibits R of 1.0 ohm, and $Q_M$ higher than 700, and the 455 kc. disc resonator employing the present materials exhibits R of 1.7 to 2.5 ohms, $Q_M$ of 1,500 to 2,400, planar coupling coefficient $k_p$ of 38% and 0.06% of a change in resonant frequency within the range 20° C. to 85° C. The invented materials clearly have highly improved piezoelectric characteristics as compared with those of conventional materials.

A time variation in the resonant frequency can generally be expressed by the formula:

$$\frac{\Delta f}{fr} = A \log_{10} T + B$$

where T is the aging time; A, a constant related to a time variation at a constant temperature; and B, a constant decided by an initial condition independent from the aging time. While the best material commercially available has 0.08% of A, the present invented materials have 0.065% at 50° C. for a testing period of 1,000 to 10,000 hours. The present value of A is more suitable for resonators.

The present invention will now be described in detail with reference to the accompanying drawings, in which:

FIGS. 3 and 4 are graphical representations of the effect of compositional change on dielectric constant ($\epsilon$) and planar coupling coefficient ($k_p$) at 20° C. and 1 kc. for the novel basic ternary system $$xPb(Mg_{1/3}Nb_{2/3})O_3 - yPbTiO_3 - zPbZrO_3$$

as a parameter of $Pb(Mg_{1/3}Nb_{2/3})O_3$, those values of binary system ($x=0$) are adopted from Jaffe et al., published in the Journal of Research of the National Bureau of Standards, vol. 55, No. 5, November 1955, pp. 239–254;

Figure 1:
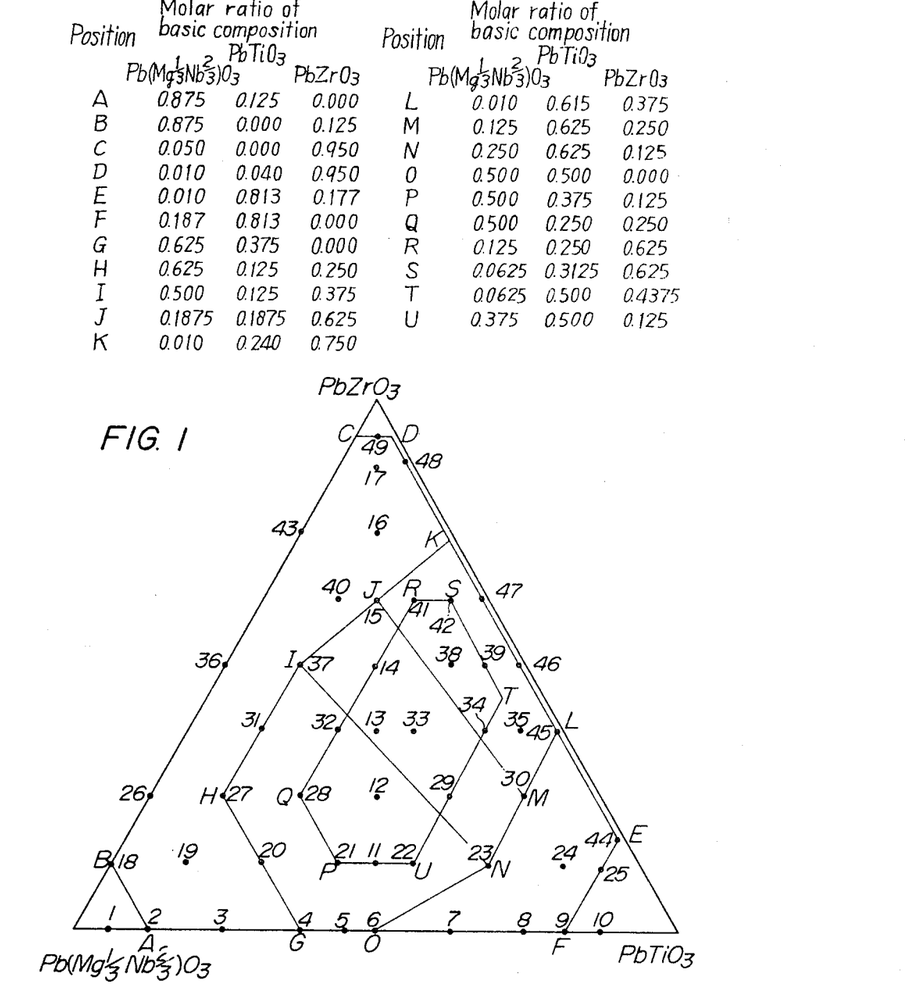
FIG. 1 represents the triangular compositional diagram of the ternary system utilized in the present invention.
Figure 2:
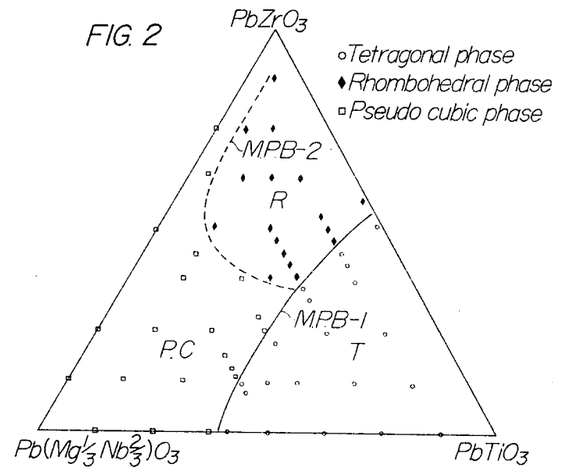
FIG. 2 is a diagram showing the crystalline structure of the specimens as determined by X-ray analysis.

Referring to FIG. 1, which represents the triangular compositional diagram of the ternary solid solution, the system within the polygonal region ABCDEF exhibits a planar coupling coefficient of approximately 5% or higher. Within the polygonal region GHIKLNO, ceramic products exhibit a planar coupling coefficient of approximately 20% or higher. Within the polygonal region PQRSTU, which includes compositions of 50.0–6.25 mole percent of $Pb(Mg_{1/3}Nb_{2/3})O_3$, 50.0–25.0 mole percent of $PbTiO_3$ and 62.5–12.5 mole percent of $PbZrO_3$, ceramic products exhibit a planar coupling coefficient of approximately 30% or higher. With particular reference to FIG. 2, the compositions near the morphotropic phase boundary (M.P.B.$^{-1}$), particularly those containing 37.5–12.5 mole percent of $Pb(Mg_{1/3}Nb_{2/3})O_3$, give ceramic products having a planar coupling coefficient of 40% or higher. This value is higher than the value obtainable with the compositions in the vicinity of the morphotropic phase boundary of the ternary solid solution, $PbTiO_3$-$PbZrO_3$-$PbSnO_3$, described in U.S. Patent No. 2,849,404. Further, compositions in the polygonal region GHIKLNO containing additives, such as $MnO_2$ and so on, exhibit a small resonant resistance, and also some compositions in the region GHINO or JKLM show a small change in resonant frequency less than 0.5% within the temperature range of 20° to 85° C. These products are highly valuable as piezoelectric ceramic materials such as 455 kc. ceramic filters for radio use and 4.5 mc. ceramic filters for TV use. The region IJMN includes a composition exhibiting the highest planar coupling coefficient among all compositions of the present invention. The composition of the highest planar coupling coefficient is 25.0 mole percent of $Pb(Mg_{1/3}Nb_{2/3})O_3$, 37.5 mole percent of $PbTiO_3$ and 37.5 mole percent of $PbZrO_3$. Almost all of the compositions within the range exhibit a planar coupling coefficient of higher than 23%.

PRACTICAL EXAMPLES

To obtain ceramic materials according to the present invention, starting materials including PbO or $Pb_3O_4$, MgO or $MgCO_3$, $Nb_2O_5$ or $Nb(OH)_5$, $TiO_2$ and $ZrO_2$ and additives selected from a group including $MnO_2$, CoO, NiO, $Fe_2O_3$ and $Cr_2O_3$ are intimately mixed in a rubber-lined ball mill with distilled water. The same effect is obtained with the addition of additives after and before calcining of basic compositions. Each batch intended is weighed to yield about 100 g. of calcined material. The mixtures, after being dried, are molded into desirable forms at a pressure of 400 kg./cm.$^2$. The blocks are calcined at 850° C. for two hours, and wet-pulverized in the ball mill and dried. The dry products containing a small amount of distilled water are molded into discs of 20 mm. diameter and 2 mm. thickness at a pressure of 700 kg./cm.$^2$. The molded discs are fired at a desirable temperature for a desirable period. In this invention a heating period of 45 minutes is used. According to the present invention, there is no need to fire the composition in an atmosphere of PbO and no special care is required for the temperature gradient in a furnace compared with the prior art. Thus, according to the present invention, uniform and excellent piezoelectric ceramic products can be easily obtained simply by covering the samples with an alumina crucible. The sintered ceramic products are polished on both surfaces to the thickness of one millimeter. The polished disk is coated on both surfaces with silver paint and fired at 800° C. to form electrodes. The specimen having electrodes formed thereon is tested for its dielectric constant and dissipation factors at 20° C. in a relative humidity of 50% and at a frequency of 1 kc. For polarization, the specimens are immersed in a bath of silicon oil at 100° C., charged by a D.-C. voltage of 4 kv./mm. for one hour, and field-cooled to the room temperature in thirty minutes. The dielectric and piezoelectric properties of the polarized specimens have been measured and are listed in Tables 1 and 2. A measurement of piezoelectric properties was made by the IRE standard circuit and the planar coupling coefficient was determined by the resonant to antiresonant frequency method. The X-ray analysis was carried out at room temperature by the powder method.

The specimen numbers in Tables 1 and 2 and the compositional regions according to the present invention are shown in FIG. 1, which represents the triangular compositional diagram of solid solution $Pb(Mg_{1/3}Nb_{2/3})O_3$-$PbTiO_3$-$PbZrO_3$. Compositions defined by the polygonal ABCDEF have characteristics as described hereinbefore and shown in detail in Tables 1 and 2. With ceramic compositions containing $Pb(Mg_{1/3}Nb_{2/3})O_3$ more than 87.5 mole percent, the piezoelectricity is weak and their planar coupling coefficient is low. For this reason they are excluded from the scope of the present invention. Compositions containing a small amount of $$Pb(Mg_{1/3}Nb_{2/3})O_3$$

exist in a poorly sintered body which results in low piezoelectric properties. Therefore, the ceramic compositions should contain $Pb(Mg_{1/3}Nb_{2/3})O_3$ more than one mole percent. It has been well known to add a small amount of $Nb_2O_5$ to $Pb(Ti-Zr)O_3$ for improvement of piezoelectric properties. The present invention, however, clarified that those compositions containing only a small amount of $Pb(Mg_{1/3}Nb_{2/3})O_3$ exhibit a poor sinterability and accordingly have inferior piezoelectric properties as pointed out above. This indicates that the addition of a small amount of $Pb(Mg_{1/3}Nb_{2/3})O_3$ does not have a promoting effect on the sintering of $Pb(Ti-Zr)O_3$. On the other hand, those compositions which contain $PbTiO_3$ of 81.3 mole percent or more can hardly be sintered into ceramic products. Therefore, they also are excluded from the scope of the present invention. Further, ceramic compositions containing 95 mole percent or more of $PbZrO_3$ exhibit only a low piezoelectricity at about room temperature and are also excluded from the scope of the present invention.

In FIG. 2, which represents a diagram showing the crystalline phases of the ceramic compositions according to the present invention as determined at room temperature by the powder method of X-ray analysis, T represents the tetragonal phase having a ferroelectricity; R represents the rhombohedral phase having a ferroelectricity; and P.C represents the pseudocubic phase which also is ferroelectric. In this ternary system, there exists a morphotropic transition boundary including compositions close to the specimens Nos. 5, 21, 12, 33 and 38. Thus, the transition boundary runs close to a composition containing 59.0 mole percent of $Pb(Mg_{1/3}Nb_{2/3})O_3$ and 41.0 mole percent of $PbTiO_3$, a composition containing 50.0 mole percent of $Pb(Mg_{1/3}Nb_{2/3})O_3$, 37.5 mole percent of $PbTiO_3$ and 12.5 mole percent of $PbZrO_3$, a composition containing 37.5 mole percent of $$Pb(Mg_{1/3}Nb_{2/3})O_3$$

37.5 mole percent of $PbTiO_3$ and 25.0 mole percent of $PbZrO_3$, a composition containing 25.0 mole percent of $Pb(Mg_{1/3}Nb_{2/3})O_3$, 37.5 mole percent of $PbTiO_3$ and 37.5 mole percent of $PbZrO_3$, and a composition containing 12.5 mole percent of $Pb(Mg_{1/3}Nb_{2/3})O_3$, 37.5 mole percent of $PbTiO_3$ and 50.0 mole percent of $PbZrO_3$.

Figure 3:
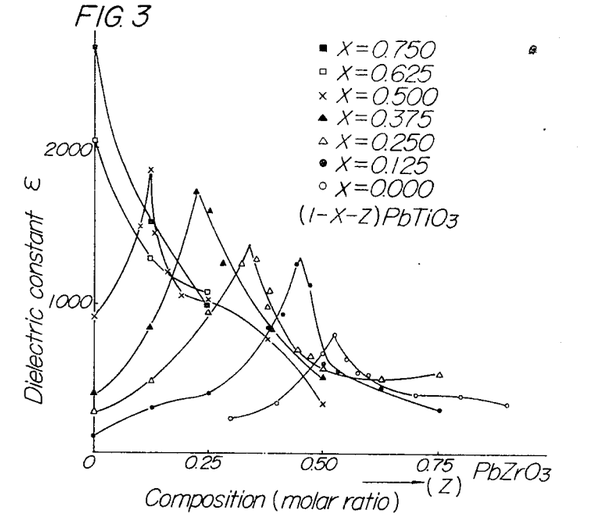
Figure 4:
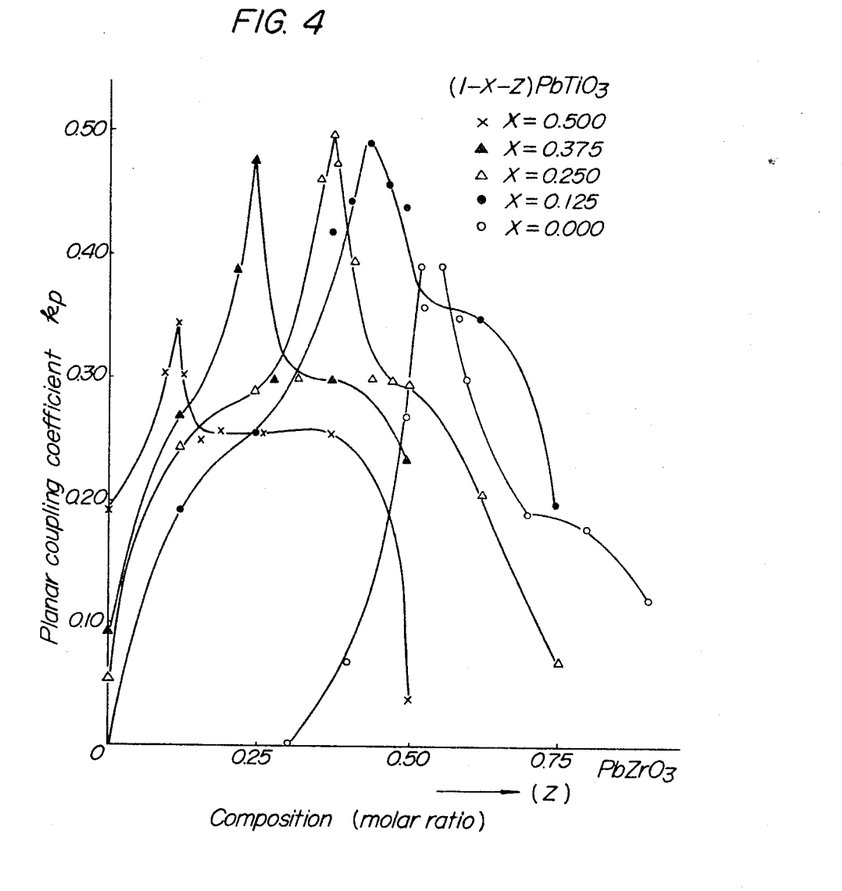

FIGS. 3 and 4 indicate that when a molar ratio of $PbZrO_3$ to $PbTiO_3$ is changed at a constant proportion of $Pb(Mg_{1/3}Nb_{2/3})O_3$, the inventive ceramic compositions in the vicinity of the morphotropic transition boundary (M.P.B.$^{-1}$) give the highest dielectric constants and the highest planar coupling coefficients. This is one example of morphotropism between ferroelectric phases in solid solution of a complex compound with perovskite-type structure.

Figure 5:
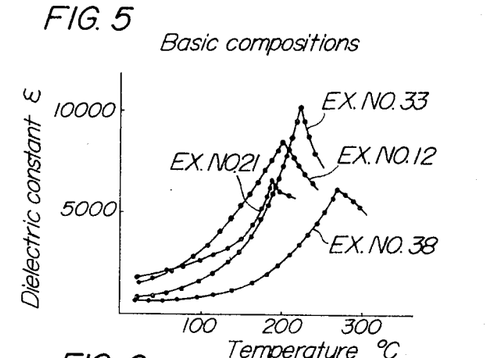
FIG. 5 is a graphical representation of the temperature dependence of the dielectric constant ($\epsilon$) of exemplary basic compositions according to the present invention.
Figure 6:
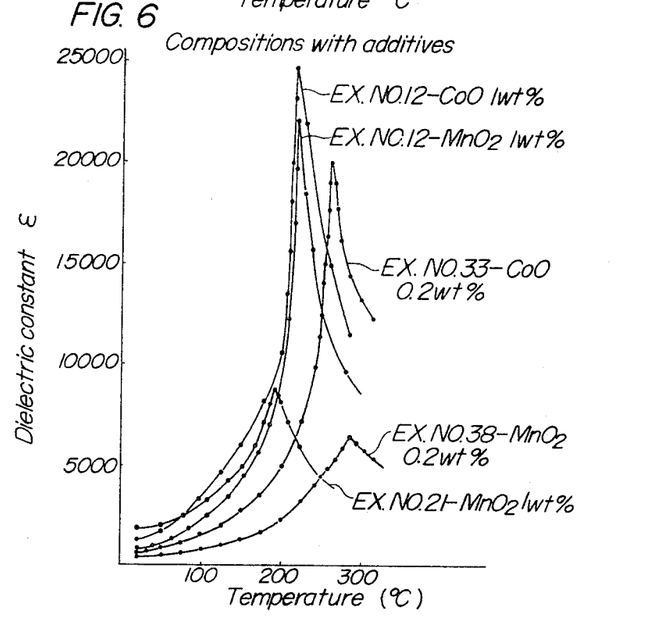
FIG. 6 is a graphical representation of the temperature dependence of the dielectric constant ($\epsilon$) of exemplary compositions with additives according to the present invention.

FIGS. 5 and 6 show the temperature variation in the dielectric constant of the ceramic compositions according to the present invention with and without additives such as $MnO_2$ and CoO. It will be observed from FIGS. 5 and 6 that the ceramic compositions of the present invention have a relatively high Curie temperature.

Figure 7:
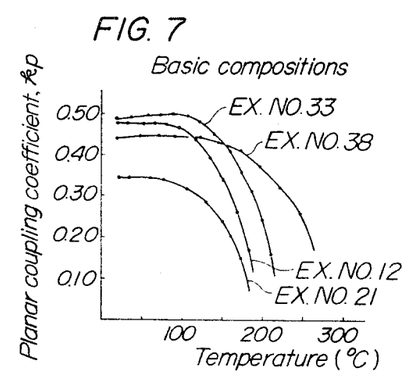
FIG. 7 graphically illustrates the temperature dependence of the planar coupling coefficient ($k_p$) of the same specimens as used in FIG. 5.
Figure 8:
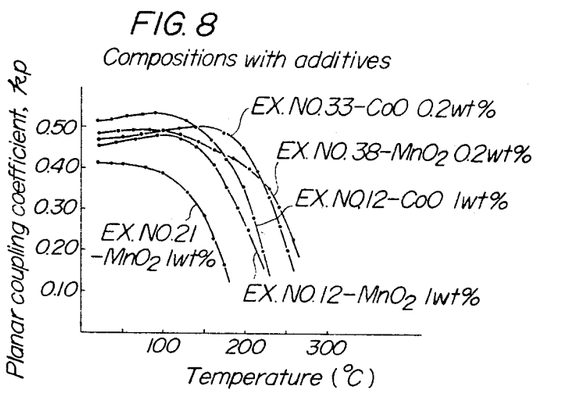
FIG. 8 graphically illustrates the temperature dependence of the planar coupling coefficient ($k_p$) of the same specimens as used in FIG. 6.

FIGS. 7 and 8 show the variation with temperature of the planar coupling coefficient of the same specimens as those in FIGS. 5 and 6. It will be apparent from these figures that the ceramic compositions according to the present invention apparently have piezoelectric properties utilizable over a wide range of temperatures.

Figure 9:
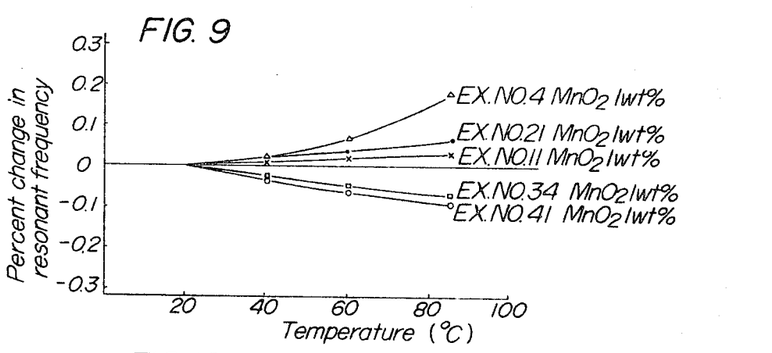
FIG. 9 graphically represents the temperature dependence of the resonant frequency of the exemplary compositions according to the present invention.

FIG. 9 shows the temperature dependence of the resonant frequency of the inventive ceramic compositions as measured within the temperature range of from 20° to 85° C. It is clear from this figure that the inventive ceramic compositions have a small temperature variation in resonant frequency.

Figure 10:
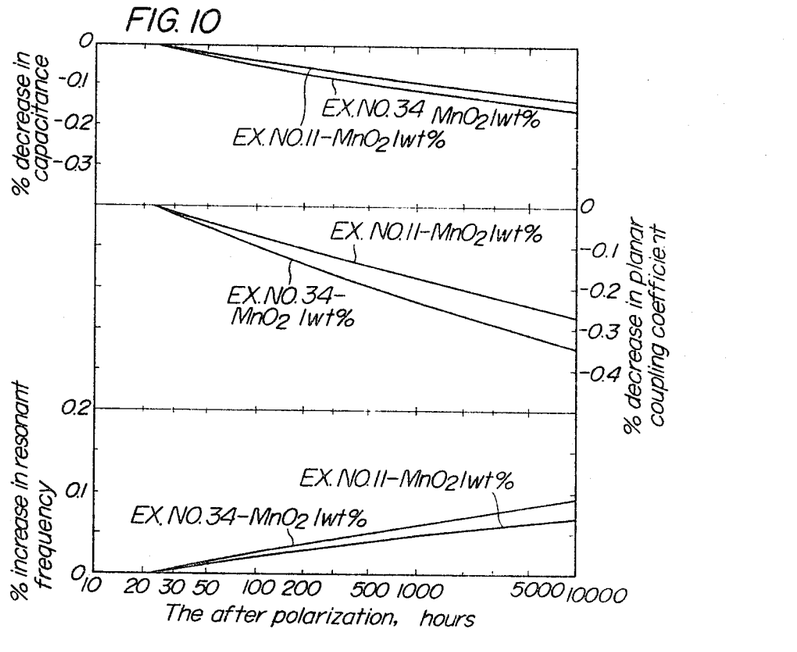
FIG. 10 graphically represents the aging characteristics of resonant frequency ($f_r$), planar coupling coefficient ($k_p$) and capacitance (C) of exemplary compositions according to the present invention.

FIG. 10 shows the aging characteristics of various exemplary compositions. In all cases the starting point of the curve is 24 hours after polarization. It will be seen from this figure that the aging characteristics of these materials are excellent, compared with data on a commercially available lead titanate zirconate composition.

Table 1 shows the dielectric, piezoelectric and ceramic properties of the present ceramic compositions with or without the oxide of Mn, Co, Ni, Fe or Cr in an amount of up to one percent by weight. The addition of an oxide to the basic compositions apparently reduces their resonant resistance to a substantial extent. The addition is also effective to increase their mechanical quality factor and improve their planar coupling coefficient. Further, the addition reduces the temperature variation of their resonant frequency. Thus, these additives improve not only the sinterability of the ceramic materials but also their piezoelectric properties and particularly reduce their resonant resistance enhancing their mechanical quality factor. Specially, the addition of manganese oxide or manganese compound thermally converted into the oxide promotes the desirable effects mentioned above. Almost all the ceramic compositions according to the present invention exhibit a planar coupling coefficient of higher than 5% and particularly those in the vicinity of the morphotropic transition boundary exhibit high values of 45 to 50%. The compositions containing 50.0 mole percent of $Pb(Mg_{1/3}Nb_{2/3})O_3$, 37.5 mole percent of $PbTiO_3$ and 12.5 mole percent of $PbZrO_3$ or thereabout, have a relatively small resonant resistance. This means that they are adequate for 455 kc. or 4.5 mc. ceramic filters for radio or TV use. With or without additives, the ternary solid solution ceramics exhibit the smallest resonant resistance along the morphotropic transition boundary and near the boundary the resistance increases slowly. The addition of the metal oxides is effective to reduce the resonant resistance over the entire range of composition and is particularly effective for compositions containing 37.5, 37.5 and 25.0 mole percent or thereabout of $Pb(Mg_{1/3}Nb_{2/3})O_3$, $PbTiO_3$ and $PbZrO_3$, respectively. Without additives, the mechanical quality factor $Q_M$ in the vicinity of the morphotropic transition boundary (M.P.B.$^{-1}$) is approximately 100 and, with addition of the oxide of Mn, Co, Ni, Fe or Cr, is increased and specially increased nearly by one order with the addition of manganese oxide. The temperature change in resonant frequency within the range 20° to 85° C. is low with compositions containing 0.500, 0.500 and 0.000; or 0.4375, 0.4375 and 0.125; or 0.375, 0.375 and 0.250; or 0.500, 0.375 and 0.125; or 0.500, 0.250 and 0.250; or 0.125, 0.500 and 0.375; or 0.125, 0.250 and 0.625 molar ratio or thereabout of $Pb(Mg_{1/3}Nb_{2/3})O_3$, $PbTiO_3$ and $PbZrO_3$, respectively, with or without additives. Particularly when one percent by weight or thereabout of the oxide of Mn or Co is added, the temperature change in resonant frequency clearly decreases.

The data of the ceramic compositions of the present invention including additives less than 3% (in some case less than 7%) by weight are shown in Table 2. The dielectric constant has a tendency to be reduced as the amount of additive increases. The planar coupling coefficient is increased with some compositions containing additive less than one percent by weight but is slowly reduced as the additive amount increases over one percent. One percent by weight of the additive gives a minimum resonant resistance and a maximum mechanical quality factor $Q_M$, but any additive more than 1% impairs both qualities. When the oxide is added in an amount exceeding 3% by weight, the leakage current during polarization increases and a satisfactory remanent piezoelectricity is difficult to obtain.

It will be understood from the foregoing that the ternary solid solution $Pb(Mg_{1/3}Nb_{2/3})O_3$-$PbTiO_3$-$PbZrO_3$ according to the present invention and the solid solution including an appropriate additive form excellent piezoelectric ceramic bodies. While there have been described what at present are believed to be the preferred embodiments of this invention, it will be obvious that various changes and modifications can be made therein without departing from the invention, and it is aimed, therefore, to cover in the appended claims all such changes and modifications as fall within the true spirit and scope of the invention.

TABLE 1

| Ex. No. | Molar ratio of basic composition | | | Additive, percent by weight | Firing temp., °C. | Density, gms./cm.³ | 24 hours after poling | | | | | | Temperature change in resonant frequency¹, percent |
|---|---|---|---|---|---|---|---|---|---|---|---|---|---|
| | $Pb(Mg_{1/3}Nb_{2/3})O_3$ x | $PbTiO_3$ y | $PbZrO_3$ z | | | | Dielectric constant ε, at 1 kc. p.s. | Dissipation, D, in percent at 1 kc. p.s. | Resonant frequency $f_r$, c.p.s. | Planar coupling coeff., $k_p$ | Resonant resistance R, Ω | Mechanical quality factor, $Q_M$ | |
| 1 | 0.938 | 0.062 | 0.000 | None | 1,150 | 6.95 | 4,986 | 1.25 | 131,828 | 0.04 | 1,591.0 | 41 | 1.97 |
| 2g | 0.875 | 0.125 | 0.000 | None | 1,250 | 7.24 | 2,847 | 1.23 | 143,524 | .046 | 139.2 | 404 | 0.96 |
| | | | | $MnO_2$ 0.2 | 1,250 | 7.36 | 2,696 | 1.14 | 142,415 | .074 | 35.7 | 1,411 | (²) |
| | | | | $MnO_2$ 1.0 | 1,230 | 7.41 | 2,553 | 1.50 | 142,008 | .080 | 28.9 | 1,266 | |
| 3 | 0.750 | 0.250 | 0.000 | None | 1,270 | 7.27 | 2,689 | 3.66 | 140,055 | .144 | 95.0 | 109 | 0.32 |
| | | | | None | 1,270 | 7.49 | 2,027 | 2.83 | 138,381 | .182 | 62.2 | 134 | 0.28 |
| 4 | 0.625 | 0.375 | 0.000 | $MnO_2$ 0.2 | 1,230 | 7.48 | 1,761 | 0.35 | 131,591 | .373 | 4.0 | 644 | 0.22 |
| | | | | $MnO_2$ 1.0 | 1,230 | 7.67 | 2,150 | 1.97 | 136,963 | .424 | 2.2 | 718 | 0.18 |
| 5 | 0.590 | 0.410 | 0.000 | None | 1,270 | 7.44 | 1,296 | 1.13 | 135,206 | .244 | 40.0 | 193 | |
| | | | | None | 1,270 | 7.54 | 915 | 1.22 | 137,495 | .196 | 80.4 | 206 | −0.26 |
| | | | | $MnO_2$ 0.2 | 1,250 | 7.39 | 770 | 0.30 | 141,907 | .216 | 18.0 | 953 | −0.20 |
| | | | | $MnO_2$ 1.0 | 1,240 | 7.38 | 680 | 0.99 | 144,936 | .232 | 23.7 | 706 | −0.16 |
| | | | | CoO 0.2 | 1,250 | 7.36 | 882 | 0.50 | 136,318 | .262 | 31.3 | 304 | −0.22 |
| | | | | CoO 1.0 | 1,220 | 7.32 | 837 | 1.18 | 143,003 | .219 | 21.0 | 664 | −0.15 |
| 6 | 0.500 | 0.500 | 0.000 | NiO 0.2 | 1,250 | 7.52 | 920 | 0.84 | 134,940 | .268 | 53.9 | 181 | |
| | | | | NiO 1.0-g | 1,250 | 7.55 | 895 | 0.59 | 142,073 | .284 | 26.1 | 319 | |
| | | | | $FeO_3$ 0.2 | 1,250 | 7.60 | 971 | 1.12 | 143,121 | .248 | 35.8 | 205 | |
| | | | | $FeO_3$ 1.0 | 1,240 | 7.59 | 761 | 3.50 | 141,977 | .175 | 64.1 | 461 | |
| | | | | $Cr_2O_3$ 0.2 | 1,250 | 7.50 | 881 | 0.65 | 143,322 | .273 | 37.4 | 244 | |
| | | | | $Cr_2O_3$ 1.0 | 1,240 | 7.53 | 942 | 1.35 | 150,897 | .183 | 42.7 | 400 | |
| 7 | 0.375 | 0.625 | 0.000 | None | 1,240 | 7.41 | 397 | 1.09 | 122,811 | .098 | 373.0 | 410 | −0.31 |
| 8 | 0.250 | 0.750 | 0.000 | do | 1,230 | 7.33 | 263 | 1.60 | 141,026 | .059 | 1,394.0 | 300 | 0.28 |
| 9 | 0.187 | 0.813 | 0.000 | do | 1,220 | 7.08 | 224 | 1.26 | 142,574 | .070 | 1,695.0 | 250 | 0.30 |
| 10 | 0.125 | 0.875 | 0.000 | do | 1,200 | 6.54 | 137 | 3.20 | No Detectable | | | | |
| | | | | None | 1,260 | 7.40 | 1,356 | 1.70 | 136,339 | .257 | | 156 | −0.20 |
| 11 | 0.4375 | 0.4375 | 0.125 | $MnO_2$ 0.2 | 1,250 | 7.56 | 1,247 | 0.33 | 136,326 | .375 | 11.6 | 450 | 0.05 |
| | | | | $MnO_2$ 1.0 | 1,230 | 7.64 | 1,167 | 0.87 | 143,157 | .380 | 2.8 | 1,513 | 0.04 |
| | | | | None | 1,280 | 7.60 | 1,587 | 2.32 | 127,488 | .480 | 18.9 | 96 | −0.19 |
| | | | | $MnO_2$ 0.2 | 1,280 | 7.58 | 1,240 | 0.39 | 127,672 | .483 | 5.4 | 425 | −0.16 |
| | | | | $MnO_2$ 1.0 | 1,270 | 7.43 | 742 | 0.81 | 135,372 | .453 | 2.6 | 1,577 | −0.15 |
| | | | | CoO 0.2 | 1,250 | 7.45 | 1,283 | 1.45 | 120,078 | .492 | 16.4 | 131 | −0.17 |
| | | | | CoO 1.0 | 1,250 | 7.40 | 1,106 | 1.46 | 125,327 | .513 | 6.5 | 350 | −0.15 |
| 12 | 0.375 | 0.375 | 0.250 | NiO 0.2 | 1,250 | 7.58 | 1,512 | 1.95 | 121,117 | .480 | 17.0 | 152 | |
| | | | | NiO 1.0 | 1,250 | 7.57 | 1,646 | 2.87 | 105,891 | .502 | 14.9 | 149 | |
| | | | | $Fe_2O_3$ 0.2 | 1,250 | 7.56 | 1,525 | 1.94 | 127,718 | .476 | 16.2 | 168 | |
| | | | | $Fe_2O_3$ 1.0 | 1,250 | 7.41 | 1,475 | 2.20 | 125,503 | .454 | 14.3 | 260 | |
| | | | | $Cr_2O_3$ 0.2 | 1,270 | 7.58 | 1,507 | 1.83 | 127,663 | .472 | 17.1 | 118 | |
| | | | | $Cr_2O_3$ 1.0 | 1,250 | 7.46 | 1,704 | 3.87 | 131,580 | .431 | 14.2 | 153 | |

See footnotes at end of table.

TABLE 1—Continued

| Ex. No. | Molar ratio of basic composition | | | Additive, percent by weight | Firing temp., °C. | Density, gms./cm.$^3$ | 24 hours after poling | | | | | | Temperature change in resonant frequency[1], percent |
|---|---|---|---|---|---|---|---|---|---|---|---|---|---|
| | $Pb(Mg_{1/3}Nb_{2/3})O_3$ x | $PbTiO_3$ y | $PbZrO_3$ z | | | | Dielectric constant $\epsilon$, at 1 kc. p.s. | Dissipation, D, in percent at 1 kc. p.s. | Resonant frequency $f_r$, c.p.s. | Planar coupling coeff., $k_p$ | Resonant resistance R, Ω | Mechanical quality factor, $Q_M$ | |
| 13 | 0.3125 | 0.3125 | 0.375 | None | 1,290 | 7.57 | 989 | 3.17 | 139,567 | .280 | 51.6 | 151 | 0.80 |
| | | | | $MnO_2$ 0.2 | 1,280 | 7.59 | 613 | 0.38 | 137,849 | .362 | 13.2 | 600 | 0.35 |
| | | | | $MnO_2$ 1.0 | 1,270 | 7.55 | 477 | 0.41 | 144,509 | .334 | 5.3 | 2,123 | 0.21 |
| 14 | 0.250 | 0.250 | 0.500 | None | 1,300 | 7.54 | 566 | 3.32 | 144,908 | .295 | 64.1 | 221 | −0.54 |
| | | | | $MnO_2$ 0.2 | 1,300 | 7.57 | 484 | 0.63 | 147,552 | .314 | 26.5 | 478 | −0.50 |
| | | | | $MnO_2$ 1.0 | 1,290 | 7.45 | 329 | 0.30 | 151,383 | .277 | 6.4 | 3,568 | −0.48 |
| 15 | 0.1875 | 0.1875 | 0.625 | None | 1,300 | 7.51 | 429 | 3.10 | 151,530 | .234 | 87.5 | 277 | 0.78 |
| | | | | $MnO_2$ 0.2 | 1,290 | 7.49 | 397 | 0.77 | 149,851 | .217 | 50.0 | 602 | |
| | | | | $MnO_2$ 1.0 | 1,280 | 7.53 | 254 | 0.27 | 152,730 | .185 | 16.5 | 3,809 | |
| 16 | 0.125 | 0.125 | 0.750 | None | 1,310 | 7.41 | 288 | 2.56 | 151,353 | .199 | 129.3 | 391 | |
| 17 | 0.0625 | 0.0625 | 0.875 | None | 1,300 | 7.22 | 251 | 2.75 | 153,585 | .125 | 275.4 | 462 | |
| 18 | 0.875 | 0.000 | 0.125 | do | 1,240 | 6.53 | 2,150 | 1.48 | 149,153 | .60 | 892.0 | 290 | |
| 19 | 0.750 | 0.125 | 0.125 | do | 1,270 | 7.36 | 1,521 | 2.97 | 150,322 | .214 | 58.0 | 151 | |
| 20 | 0.625 | 0.250 | 0.125 | do | 1,270 | 7.57 | 1,277 | 2.80 | 139,727 | .262 | 86.4 | 82 | 0.55 |
| 21 | 0.500 | 0.375 | 0.125 | None | 1,270 | 7.58 | 1,848 | 1.35 | 136,878 | .346 | 21.0 | 113 | −0.18 |
| | | | | $MnO_2$ 0.2 | 1,270 | 7.30 | 1,932 | 0.36 | 126,975 | .454 | 3.1 | 517 | −0.08 |
| | | | | $MnO_2$ 1.0 | 1,260 | 7.06 | 1,663 | 1.40 | 135,008 | .410 | 1.7 | 1,243 | 0.06 |
| 22 | 0.375 | 0.500 | 0.125 | None | 1,260 | 7.57 | 840 | 1.60 | 141,941 | .274 | 49.5 | 187 | −0.33 |
| 23 | 0.250 | 0.625 | 0.125 | do | 1,250 | 7.47 | 487 | 1.64 | 148,169 | .246 | 7200 | 262 | |
| 24 | 0.125 | 0.750 | 0.125 | do | 1,250 | 7.46 | 302 | 2.22 | 149,075 | .194 | 142.7 | 360 | |
| 25 | 0.0625 | 0.8125 | 0.125 | do | 1,130 | 6.26 | 182 | 2.20 | 178,962 | .074 | 297.1 | 217 | |
| 26 | 0.750 | 0.000 | 0.250 | do | 1,270 | 7.07 | 973 | 2.09 | 148,079 | .080 | 462.0 | 150 | |
| 27 | 0.625 | 0.125 | 0.250 | do | 1,270 | 7.63 | 1,046 | 3.10 | 140,491 | .164 | 56.1 | 306 | |
| 28 | 0.500 | 0.250 | 0.250 | None | 1,280 | 7.55 | 1,011 | 3.15 | 141,303 | .257 | 45.0 | 189 | −0.28 |
| | | | | $MnO_2$ 0.2 | 1,280 | 7.55 | 890 | 0.75 | 137,750 | .356 | 9.7 | 567 | −0.19 |
| | | | | $MnO_2$ 1.0 | 1,260 | 7.57 | 700 | 0.53 | 147,753 | .231 | 7.4 | 1,956 | −0.08 |
| 29 | 0.250 | 0.500 | 0.250 | None | 1,300 | 7.50 | 920 | 1.43 | 132,849 | .290 | 66.7 | 126 | −0.25 |
| | | | | $MnO_2$ 0.2 | 1,290 | 7.45 | 764 | 0.30 | 143,615 | .298 | 19.7 | 450 | −0.17 |
| | | | | $MnO_2$ 1.0 | 1,280 | 7.10 | 633 | 0.50 | 138,214 | .235 | 11.7 | 1,552 | −0.08 |
| | | | | CoO 0.2 | 1,300 | 7.35 | 859 | 0.98 | 140,718 | .347 | 33.6 | 180 | |
| | | | | CoO 1.0 | 1,250 | 7.07 | 358 | 1.11 | 148,255 | .138 | 56.7 | 1,364 | |
| | | | | NiO 0.2 | 1,300 | 7.52 | 885 | 1.16 | 142,489 | .361 | 37.9 | 145 | |
| | | | | NiO 1.0 | 1,270 | 7.09 | 672 | 0.99 | 137,988 | .279 | 56.5 | 182 | |
| | | | | $Fe_2O_3$ 0.2 | 1,300 | 7.52 | 851 | 1.15 | 143,627 | .366 | 38.5 | 144 | |
| | | | | $Fe_2O_3$ 1.0 | 1,270 | 7.53 | 727 | 1.34 | 145,140 | 2.50 | 58.4 | 238 | |
| | | | | $Cr_2O_3$ 0.2 | 1,300 | 7.43 | 812 | 0.99 | 141,250 | .323 | 37.4 | 195 | |
| | | | | $Cr_2O_3$ 1.0 | 1,270 | 7.34 | 697 | 3.09 | 147,559 | .221 | 39.5 | 419 | |
| 30 | 0.125 | 0.625 | 0.250 | None | 1,310 | 7.55 | 404 | 0.95 | 142,610 | .257 | 89.0 | 246 | |
| 31 | 0.500 | 0.125 | 0.375 | do | 1,290 | 7.62 | 756 | 3.18 | 148,428 | .257 | 44.3 | 255 | |
| 32 | 0.375 | 0.250 | 0.375 | do | 1,290 | 7.54 | 806 | 3.02 | 144,308 | .302 | 44.3 | 178 | 0.51 |
| 33 | 0.250 | 0.375 | 0.375 | None | 1,300 | 7.61 | 976 | 2.52 | 130,067 | .498 | 27.0 | 103 | −0.28 |
| | | | | $MnO_2$ 0.2 | 1,270 | 7.59 | 774 | 0.62 | 132,255 | .453 | 14.1 | 282 | −0.27 |
| | | | | $MnO_2$ 1.0 | 1,240 | 7.37 | 475 | 0.64 | 141,918 | .438 | 4.6 | 1,927 | −0.20 |
| | | | | CoO 0.2 | 1,300 | 7.36 | 643 | 0.68 | 128,554 | .472 | 19.7 | 224 | |
| | | | | CoO 1.0 | 1,280 | 7.22 | 451 | 1.23 | 132,671 | .364 | 23.7 | 452 | |
| | | | | NiO 0.2 | 1,280 | 7.57 | 996 | 2.10 | 130,440 | .485 | 18.5 | 155 | |
| | | | | NiO 1.0 | 1,280 | 7.41 | 977 | 1.73 | 129,516 | .469 | 15.3 | 119 | |
| | | | | $Fe_2O_3$ 0.2 | 1,300 | 7.58 | 917 | 2.01 | 122,241 | .483 | 19.9 | 159 | |
| | | | | $Fe_2O_3$ 1.0 | 1,300 | 7.58 | 884 | 1.53 | 114,508 | .501 | 20.8 | 115 | |
| | | | | $Cr_2O_3$ 0.2 | 1,300 | 7.57 | 786 | 1.33 | 126,296 | .403 | 24.5 | 152 | |
| | | | | $Cr_2O_3$ 1.0 | 1,280 | 7.38 | 772 | 3.66 | 135,276 | .422 | 21.3 | 217 | |
| 34 | 0.125 | 0.500 | 0.375 | None | 1,310 | 7.53 | 825 | 1.02 | 137,726 | .421 | 34.8 | 133 | −0.18 |
| | | | | $MnO_2$ 0.2 | 1,300 | 7.54 | 738 | 0.29 | 136,727 | .213 | 24.5 | 707 | −0.15 |
| | | | | $MnO_2$ 1.0 | 1,280 | 7.55 | 507 | 1.56 | 133,884 | .190 | 37.5 | 861 | −0.07 |
| 35 | 0.0625 | 0.5625 | 0.375 | None | 1,200 | 7.36 | 163 | 3.20 | 149,199 | .130 | 172.8 | 122 | |
| 36 | 0.500 | 0.000 | 0.500 | None | 1,300 | 7.23 | 330 | 1.89 | 156,438 | .075 | 814.0 | 568 | |
| | | | | $MnO_2$ 0.2 | 1,300 | 7.43 | 732 | 1.35 | 153,285 | .153 | 47.8 | 751 | |
| | | | | $MnO_2$ 1.0 | 1,290 | 7.61 | 657 | 0.30 | 155,422 | .140 | 12.2 | 3,886 | |
| | | | | CoO 0.2 | 1,280 | 7.36 | 559 | 1.53 | 150,282 | .140 | 80.3 | 519 | |
| | | | | CoO 1.0 | 1,280 | 7.24 | 537 | 0.41 | 152,835 | .100 | 94.3 | 931 | |
| | | | | NiO 0.2 | 1,270 | 7.10 | 495 | 2.80 | 138,520 | .075 | 392.0 | 391 | |
| | | | | NiO 1.0 | 1,230 | 7.34 | 774 | 3.18 | 146,508 | .102 | 98.4 | 589 | |
| | | | | $Fe_2O_3$ 0.2 | 1,280 | 7.26 | 548 | 2.35 | 151,187 | .095 | 234.0 | 378 | |
| | | | | $Fe_2O_3$ 1.0 | 1,280 | 7.30 | 634 | 2.68 | 149,913 | .120 | 123.0 | 425 | |
| | | | | $Cr_2O_3$ 0.2 | 1,290 | 7.20 | 522 | 1.96 | 152,507 | .95 | 229.0 | 362 | |
| | | | | $Cr_2O_3$ 1.0 | 1,280 | 7.28 | 837 | 2.43 | 152,399 | .105 | 81.3 | 694 | |
| 37 | .0375 | 0.125 | 0.500 | None | 1,300 | 7.65 | 557 | 3.24 | 151,656 | .237 | 62.1 | 286 | |
| 38 | 0.125 | 0.375 | 0.500 | None | 1,310 | 7.44 | 593 | 2.45 | 134,156 | .440 | 47.1 | 121 | −0.44 |
| | | | | $MnO_2$ 0.2 | 1,300 | 7.45 | 532 | 0.67 | 137,145 | .473 | 44.4 | 404 | −0.41 |
| | | | | $MnO_2$ 1.0 | 1,290 | 6.96 | 316 | 1.30 | 138,813 | .470 | 22.5 | 1,375 | −0.33 |
| 39 | 0.0625 | 0.4375 | 0.500 | None | 1,230 | 7.38 | 179 | 2.40 | 128,514 | .304 | 98.3 | 230 | |
| 40 | 0.250 | 0.125 | 0.625 | do | 1,300 | 7.47 | 493 | 2.97 | 154,976 | .207 | 80.0 | 314 | |
| 41 | 0.125 | 0.250 | 0.625 | None | 1,310 | 7.43 | 432 | 2.90 | 147,262 | .250 | 92.5 | 235 | −0.18 |
| | | | | $MnO_2$ 0.2 | 1,310 | 7.44 | 367 | 0.85 | 143,289 | .179 | 84.5 | 541 | −0.11 |
| | | | | $MnO_2$ 1.0 | 1,310 | 7.33 | 257 | 1.63 | 138,837 | .125 | 239.0 | 550 | −0.09 |
| 42 | 0.0625 | 0.3125 | 0.625 | None | 1,230 | 7.41 | 348 | 2.99 | 132,994 | .265 | 135.5 | 195 | |
| 43 | 0.250 | 0.000 | 0.750 | do | 1,300 | 7.45 | 533 | 3.27 | 152,879 | .073 | 384.0 | 383 | |
| 44 | 0.010 | 0.813 | 0.177 | None | 1,200 | 7.05 | 180 | 2.13 | 127,616 | .074 | 981.0 | 787 | |
| | | | | $MnO_2$ | 1,200 | 7.24 | 170 | 1.88 | 125,519 | .082 | 437.0 | 1,345 | |
| | | | | $MnO_2$ 1.0 | 1,180 | 7.31 | 175 | 1.94 | 125,113 | .078 | 284.0 | 2,181 | |
| 45 | 0.010 | 0.615 | 0.375 | None | 1,200 | 7.15 | 328 | 4.22 | 125,174 | .100 | 146.3 | 328 | |
| 46 | 0.010 | 0.500 | 0.490 | do | 1,230 | 7.22 | 744 | 0.96 | 123,486 | .285 | 78.7 | 146 | |
| 47 | 0.010 | 0.375 | 0.615 | None | 1,230 | 7.31 | 347 | 1.70 | 128,430 | .253 | 104.5 | 309 | |
| | | | | $MnO_2$ 0.2 | 1,230 | 7.34 | 402 | 2.50 | 129,973 | .267 | 85.3 | 315 | |
| | | | | $MnO_2$ 1.0 | 1,210 | 7.34 | 424 | 2.53 | 131,538 | .258 | 74.1 | 343 | |
| | | | | CoO 0.2 | 1,220 | 7.30 | 364 | 0.75 | 139,048 | .248 | 65.1 | 425 | |
| | | | | CoO 1.0 | 1,220 | 7.53 | 351 | 2.50 | 148,960 | .243 | 40.0 | 628 | |
| | | | | NiO 0.2 | 1,220 | 7.35 | 409 | 1.40 | 114,306 | .222 | 97.4 | 355 | |
| | | | | NiO 1.0 | 1,220 | 7.32 | 413 | 1.66 | 114,008 | .226 | 76.2 | 426 | |
| | | | | $Fe_2O_3$ 0.2 | 1,220 | 7.41 | 348 | 0.98 | 119,761 | .263 | 49.0 | 581 | |
| | | | | $Fe_2O_3$ 1.0 | 1,220 | 7.28 | 395 | 0.65 | 147,395 | .264 | 30.5 | 710 | |
| | | | | $Cr_2O_3$ 0.2 | 1,230 | 7.29 | 576 | 1.14 | 119,610 | .243 | 90.3 | 566 | |
| | | | | $Cr_2O_3$ 1.0 | 1,230 | 7.24 | 261 | 2.22 | 119,940 | .192 | 85.2 | 767 | |
| 48 | 0.010 | 0.125 | 0.865 | None | 1,230 | 7.28 | 159 | 1.68 | 124,956 | .148 | 787.0 | 253 | |
| 49 | 0.025 | 0.025 | 0.950 | do | 1,250 | 7.47 | 190 | 2.97 | 154,982 | .073 | 434.7 | 1,401 | |

[1] $\dfrac{fr(85°\,C.) - fr(20°\,C.)}{fr(20°\,C.)} \times 100\%$; $fr(85°\,C.)$ and $fr(20°\,C.)$ are resonant frequency at 85° C. and 20° C., respectively.
[2] Not determined.

TABLE 2

| Ex. No. | Molar ratio of basic composition | | | Additive, percent by weight | Firing temp., °C. | Density, gms./cm.³ | 24 hours after poling | | | | | | Temperature change in resonant frequency, percent |
|---|---|---|---|---|---|---|---|---|---|---|---|---|---|
| | Pb(Mg₁/₃Nb₂/₃)O₃ x | PbTiO₃ y | PbZrO₃ z | | | | Dielectric constant ε, at 1 kc. p.s. | Dissipation, D, in percent at 1 kc. p.s. | Resonant frequency $f_r$, c.p.s. | Planar coupling coeff., $k_p$ | Resonant resistance R, Ω | Mechanical quality factor, $Q_M$ | |
| 6 | 0.500 | 0.500 | 0.000 | MnO₂ 3.0 | 1,220 | 7.42 | 695 | 5.90 | 150,590 | 0.188 | 28.2 | 888 | |
| | | | | CoO 3.0 | 1,190 | 7.31 | 797 | 13.10 | 145,263 | 0.171 | 63.9 | 378 | |
| | | | | NiO 3.0 | 1,220 | 7.38 | 911 | 0.94 | 130,035 | 0.184 | 64.7 | 281 | |
| 12 | 0.375 | 0.375 | 0.250 | MnO₂ 3.0 | 1,260 | 7.25 | 820 | 4.85 | 140,850 | 0.310 | 18.1 | 567 | |
| | | | | MnO₂ 5.0 | 1,240 | 7.39 | 797 | 11.96 | 145,888 | 0.298 | 29.6 | 293 | |
| | | | | MnO₂ 7.0 | 1,210 | 7.31 | 693 | 10.20 | 144,084 | 0.270 | 44.0 | 304 | |
| | | | | CoO 3.0 | 1,230 | 7.44 | 1,150 | 8.52 | 131,446 | 0.415 | 19.0 | 176 | |
| | | | | NiO 3.0 | 1,230 | 7.54 | 1,590 | 1.50 | 124,850 | 0.499 | 12.0 | 141 | |
| 33 | 0.250 | 0.375 | 0.375 | MnO₂ 3.0 | 1,220 | 7.05 | 436 | 4.00 | 138,985 | 0.319 | 15.1 | 933 | |
| | | | | MnO₂ 5.0 | 1,210 | 6.98 | 476 | 10.76 | 138,581 | 0.249 | 69.5 | 309 | |
| | | | | MnO₂ 7.0 | 1,180 | 6.48 | 487 | 6.20 | 143,456 | 0.236 | 47.7 | 481 | |
| | | | | CoO 3.0 | 1,200 | 7.08 | 442 | 2.93 | 132,170 | 0.316 | 22.9 | 661 | |
| | | | | NiO 3.0 | 1,230 | 7.39 | 836 | 1.77 | 132,040 | 0.416 | 22.8 | 141 | |
| | | | | Fe₂O₃ 3.0 | 1,240 | 7.50 | 854 | 1.45 | 108,991 | 0.282 | 186.5 | 57 | |
| 36 | 0.500 | 0.000 | 0.500 | MnO₂ 3.0 | 1,280 | 7.55 | 1,589 | 3.65 | 152,113 | 0.140 | 15.0 | 1,356 | |
| | | | | MnO₂ 5.0 | 1,260 | 7.41 | 1,185 | 5.55 | 151,981 | 0.052 | 128.4 | 1,095 | |
| | | | | CoO 3.0 | 1,260 | 6.95 | 510 | 0.74 | 143,202 | 0.096 | 86.5 | 1,146 | |
| | | | | NiO 3.0 | 1,230 | 7.33 | 792 | 3.30 | 147,682 | 0.102 | 118.0 | 463 | |
| | | | | Fe₂O₃ 3.0 | 1,270 | 5.80 | 402 | 2.63 | 113,779 | 0.111 | 151.0 | 273 | |
| | | | | Cr₂O₃ 3.0 | 1,270 | 7.31 | 911 | 4.53 | 155,883 | 0.070 | 172.0 | 493 | |
| 47 | 0.010 | 0.375 | 0.615 | MnO₂ 3.0 | 1,200 | 7.25 | 419 | 5.35 | 136,889 | 0.127 | 90.2 | 1,250 | |
| | | | | MnO₂ 5.0 | 1,180 | 7.21 | 365 | 15.60 | 146,827 | 0.105 | 526.5 | 242 | |
| | | | | CoO 3.0 | 1,180 | 7.59 | 362 | 2.50 | 151,090 | 0.241 | 31.4 | 875 | |
| | | | | NiO 3.0 | 1,200 | 7.40 | 385 | 1.42 | 113,972 | 0.213 | 83.5 | 514 | |

What is claimed is:

1. A ferroelectric composition consisting essentially of the ternary solid solution expressed by the general formula Pb(Mg₁/₃Nb₂/₃)$_x$Ti$_y$Zr$_z$O₃, where $x+y+z=1$, and having a composition within a polygonal region ABCDEF in the triangular composition diagram of FIGURE 1. The molar ratio of the three components of each vertices are as follows:

| | Pb(Mg₁/₃Nb₂/₃)O₃ | PbTiO₃ | PbZrO₃ |
|---|---|---|---|
| A | 0.875 | 0.125 | 0.000 |
| B | 0.875 | 0.000 | 0.125 |
| C | 0.050 | 0.000 | 0.950 |
| D | 0.010 | 0.040 | 0.950 |
| E | 0.010 | 0.813 | 0.177 |
| F | 0.187 | 0.813 | 0.000 |

2. A ferroelectric composition consisting essentially of the ternary solid solution expressed by the general formula Pb(Mg₁/₃Nb₂/₃)$_x$Ti$_y$Zr$_z$O₃, where $x+y+z=1$, and having a composition within a polygonal region ABCDEF in the triangular composition diagram of FIGURE 1 and further containing at least one element of group consisting of oxides, of manganese, cobalt, nickel, iron and chromium in a total quantity up to 3 weight percent of the respective oxides.

3. A piezoelectric ceramic composition consisting essentially of the ternary solid solution expressed by the general formula Pb(Mg₁/₃Nb₂/₃)$_x$Ti$_y$Zr$_z$O₃, where $$x+y+z=1$$

and having a composition within a polygonal region GHIKLNO in the triangular composition diagram of FIGURE 1. The molar ratio of the three components of each vertices are as follows:

| | Pb(Mg₁/₃Nb₂/₃)O₃ | PbTiO₃ | PbZrO₃ |
|---|---|---|---|
| G | 0.625 | 0.375 | 0.000 |
| H | 0.625 | 0.125 | 0.250 |
| I | 0.500 | 0.125 | 0.375 |
| K | 0.010 | 0.240 | 0.750 |
| L | 0.010 | 0.615 | 0.375 |
| N | 0.250 | 0.625 | 0.125 |
| O | 0.500 | 0.500 | 0.000 |

4. A piezoelectric ceramic composition consisting essentially of the ternary solid solution expressed by the general formula Pb(Mg₁/₃Nb₂/₃)$_x$Ti$_y$Zr$_z$O₃, where $$x+y+z=1$$

and having a composition within a polygonal region GHIKLNO in the triangular composition diagram of FIGURE 1 and further containing at least one element of the group consisting of oxides of manganese, cobalt, nickel, iron and chromium in a total quantity up to 3 weight percent of the respective oxides.

5. A piezoelectric ceramic composition consisting essentially of the ternary solid solution expressed by the general formula Pb(Mg₁/₃Nb₂/₃)$_x$Ti$_y$Zr$_z$O₃, where $$x+y+z=1$$

and having a composition within a polygonal region GHIKLNO in the triangular composition diagram of FIGURE 1 and further containing manganese oxide up to 3 weight percent.

6. A piezoelectric ceramic composition consisting essentially of a ternary solid solution expressed by the general formula Pb(Mg₁/₃Nb₂/₃)$_x$Ti$_y$Zr$_z$O₃, where $$x+y+z=1$$

and having a composition within a polygonal region PQRSTU in the triangular composition diagram of FIGURE 1. The molar ratio of the three components of each vertices are as follows:

| | Pb(Mg₁/₃Nb₂/₃)O₃ | PbTiO₃ | PbZrO₃ |
|---|---|---|---|
| P | 0.500 | 0.375 | 0.125 |
| Q | 0.500 | 0.250 | 0.250 |
| R | 0.125 | 0.250 | 0.625 |
| S | 0.0625 | 0.3125 | 0.625 |
| T | 0.0625 | 0.500 | 0.4375 |
| U | 0.375 | 0.500 | 0.125 |

7. A piezoelectric ceramic composition consisting essentially of a ternary solid solution expressed by the general formula Pb(Mg₁/₃Nb₂/₃)$_x$Ti$_y$Zr$_z$O₃, where $$x+y+z=1$$

and having a composition within a polygonal region PQRSTU in the triangular composition diagram of FIGURE 1 and further containing at least one element from the group consisting of oxides of manganese, cobalt, nickel, iron and chromium in a total quantity up to 3 weight percent of the respective oxides.

8. A piezoelectric ceramic composition consisting essentially of a ternary solid solution expressed by the general formula Pb(Mg₁/₃Nb₂/₃)$_x$Ti$_y$Zr$_z$O₃, where $$x+y+z=1$$

and having a composition within a polygonal region PQRSTU in the triangular composition diagram of FIGURE 1 and further containing manganese oxide up to 3 weight percent.

9. A wave filter element comprising an electrostatically polarized solid solution ceramics consisting essentially of $Pb(Mg_{1/3}Nb_{2/3})O_3$, $PbTiO_3$ and $PbZrO_3$ having a composition within a polygonal region JKLN in the triangular composition diagram of FIGURE 1 and further containing manganese oxide up to 3 weight percent.

10. A thickness shear disc resonator comprising an electrostatically polarized polycrystalline aggregate consisting essentially of $Pb(Mg_{1/3}Nb_{2/3})O_3$, $PbTiO_3$ and $PbZrO_3$ having a composition within a polygonal region GHINO in the triangular composition diagram of FIGURE 1 and further containing manganese oxide up to 3 weight percent.

References Cited by the Examiner
UNITED STATES PATENTS 3,179,594    4/1965    Kulcsar et al. ______ 252—62.9

OTHER REFERENCES

Smolenskii et al.: Dielectric Polarization of a Number of Complex Compounds, Semiconductor Institute, Academy of Sciences, U.S.S.R., Leningrad (translated from Fizika Tverdogo Tela, vol. 1, No. 10, pp. 1562–1572, October 1959).

Kulcsar: Electromechanical Properties of Lead Titanate Zirconate Ceramics Modified with Certain Three or Five Valent Additions, Journal of American Ceramic Society, vol. 42, No. 7, July 1959, pp. 343–49.

TOBIAS E. LEVOW, *Primary Examiner.*

R. D. EDMONDS, *Assistant Examiner.*